April 16, 1963   N. D. HELMER   3,085,551
CAT SCRATCHER
Filed May 23, 1961

INVENTOR.
NORMAN D. HELMER
BY
William C. Babcock
ATTORNEY

3,085,551
CAT SCRATCHER
Norman D. Helmer, 6298 E. Ocean Blvd.,
Long Beach, Calif.
Filed May 23, 1961, Ser. No. 111,953
1 Claim. (Cl. 119—1)

The present invention relates generally to the field of pet accessories, and more particularly to a novel improved cat scratcher.

As is well known, one typical characteristic of all cats is their deep-seated desire to periodically scratch such surfaces as tree trunks to exercise and sharpen their claws, and if such a surface is unavailable in the home in the form of a scratcher, cats, particularly the household pet, do not hesitate to use the taut fabric of upholstered furniture and drapes for this purpose. As a result, it has become almost a universal custom for those owning a cat to provide a fabric-covered surface which the pet may claw.

The usual household cat clawing device or scratcher comprises a vertically positioned post supported on a suitable base, and the post is covered with a loose-textured fabric such as carpeting, or the like. While cat scratchers of this type serve their intended purpose, they are bulky, cumbersome and not particularly attractive in appearance. Another disadvantage of such scratchers is that they are not only relatively heavy, and are most inconvenient to move from place to place in the home, but are completely unsuited for taking on a trip.

A major object of the present invention is to provide an improved cat scratcher that is substantially free of the disadvantages outlined above, is attractive in appearance, light in weight, easy to carry and pack, and is particularly adapted for being removably supported from a door in a residence.

Another object of the invention is to supply a cat scratcher of extremely simple mechanical structure that can be fabricated from standard commercially available materials, which requires no hand tools to mount it in operative position on a door where it will be readily available to a cat.

Yet another object of the invention is to provide an improved cat scratcher that can be manufactured at a relatively low cost and consequently retailed at a sufficiently low price as to encourage its widespread use.

Still another object of the invention is to furnish a cat scratcher, which due to its compact structure, light weight, and low cost, highly recommends the device for use as a premium by companies in promoting a particular cat food or accessory.

These and other objects and advantages of the invention will become apparent from the following description of a preferred form thereof, and from the accompanying drawing illustrating the same in which.

Figure 1:
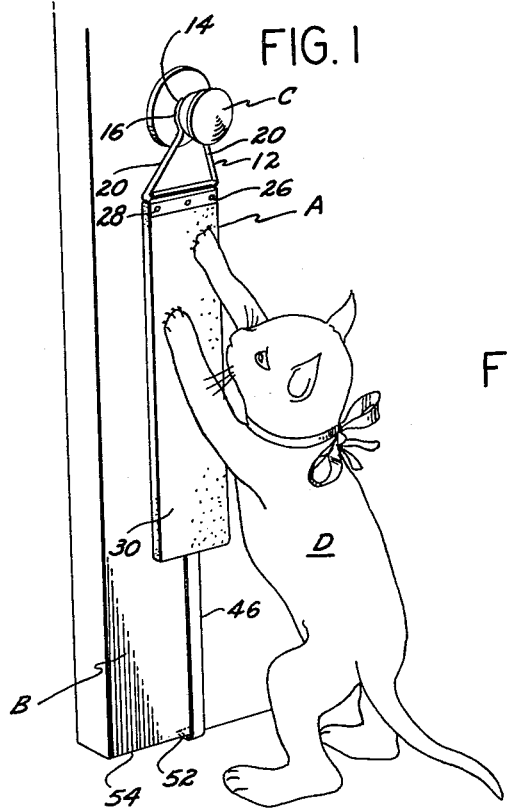
FIGURE 1 is a perspective view of the cat scratcher shown suspended from a door knob and removably affixed to the door associated therewith.

Referring now to FIGURE 1 of the drawing for the general arrangement of the preferred form A of the invention, it will be seen that it can be removably supported on a door B having a knob C projecting therefrom. When the invention A is supported in this manner it occupies a minimum of space in a room, yet is readily available for use by a cat D.

Figure 2:
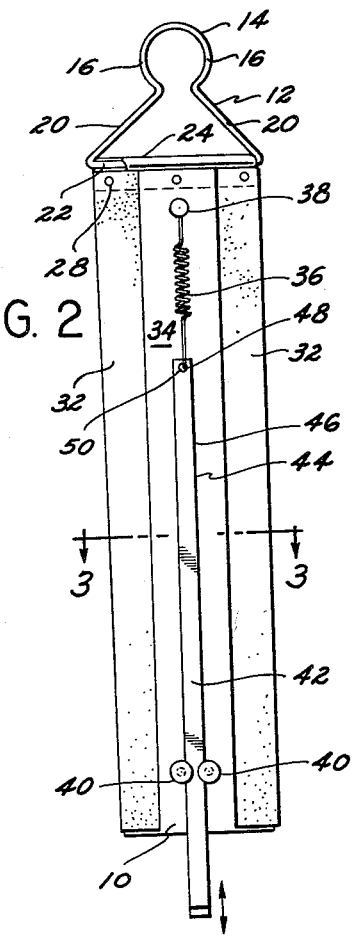
FIGURE 2 is an elevational view of the rear of the device.

The detailed structure of the preferred form A of the invention is best shown in FIGURE 2, and includes an elongate rectangular member 10 that is preferably formed from wood. A bail 12, preferably formed by bending a length of steel wire is provided, which includes a generally U-shaped upper portion 14 that has identical oppositely disposed sides 16 that extend inwardly towards one another and partially encircle a rearwardly disposed portion of knob C which is of lesser transverse cross section than the main body of the knob. The lower ends of sides 16 develop into arms 20 that angle outwardly from one another in opposite directions.

Short coaxially aligned legs 22 are formed on the lower ends of arms 20 which extend into opposite ends of a tubular member 24 that is transversely affixed to the upper portion of member 10. Tubular member 24 has a tab 26 extending downwardly therefrom, and a plurality of nails or screws 28 extend through tab 26 to engage member 10, as may best be seen in FIGURE 1. A rectangular sheet of fibrous material 30, preferably carpeting, is so wrapped transversely about member 10 that longitudinally extending sections 32 thereof overlie sections of the surface 34 of member 10. Surface 34 is inwardly disposed, as may be seen in FIGURE 1, when the invention is in an operative position, and removably supported from knob C by bail 12.

A helical spring 36 depends from a supporting member 38 affixed to the upper portion of surface 34. Two laterally spaced guides 40 are also affixed to surface 34, located a substantial distance below member 38. Guides 40 are preferably disposed on opposite sides of a longitudinally extending center line 42 of member 10 that extends through member 38. The vertically positionable leg 46 of an L-shaped holding member 44 is positioned between guides 40 and in slidable contact with surface 34 of member 10. Spring 36 is provided with a lower eye 48 that engages an opening 50 in the upper part of leg 46. A second leg 52 which is no longer than the width of door B, extends rearwardly from the lower end of leg 46. When the invention is supported from knob B as shown in FIGURE 1, the leg 52 is positioned under the lower edge 54 of the door, and is urged upwardly thereagainst due to the tension exerted by spring 36.

Due to the fact that sections 32 of the fibrous material 30 are at least partially in contact with surface 34 of the door B, and the leg 52 is in frictional pressure contact with the lower edge 54, the invention is removably held in a fixed position on the door. When the cat scratcher is so disposed it will resist even the most vigorous clawing by a cat D.

Figure 4:
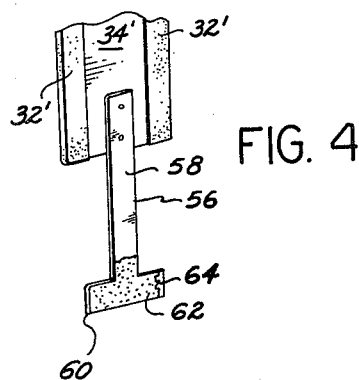
Figure 3:
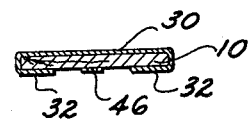
FIGURE 3 is a transverse cross-sectional view of the cat scratcher taken on line 3—3 of FIGURE 2; and, FIGURE 4 is a perspective view of the lower portion of a first alternate form of the invention.

A first alternate form of the invention is shown in FIGURE 4, which differs from the preferred form thereof only in the holding means utilized to prevent the lower part of the scratcher from moving laterally relative to door B when it is being clawed by a cat D. The portions of the first alternate form of the invention that are common to the preferred form are identified in FIGURE 4 by the same numerals, but to which a prime has been added.

In the first alternate form of the cat scratcher the spring 36, holding member 44, supporting member 38 and guides 40 are omitted. Instead, an inverted T-shaped piece of fabric or other light-weight sheet material 56 is provided that includes a first leg 58 and a second leg 60. The upper end portion of leg 58 is tacked or otherwise affixed to the lower part of surface 34' of member 10'. At least a part of the surface of leg 60 adjacent the surface of door B from which knob C projects is coated with a pressure-sensitive adhesive 62. The adhesive 62, prior to use of the invention, is preferably covered with a protective film 64. When the first alternate form of the invention is to be used, it is suspended from the knob C in the same manner as the preferred form, and the adhesive-covered leg 60 pressed against door B where it is removably affixed thereto.

The use of both the preferred and alternate forms of the invention have been described in detail hereinabove and need not be repeated.

Although the present invention is fully capable of achieving the objects and providing the advantages hereinbefore mentioned it is to be understood that it is merely illustrative of the presently preferred embodiments thereof and I do not means to be limited to the details of construction herein shown and described, other than as defined in the appended claim.

I claim:

A cat scratcher adapted to be removably mounted on a door having a knob projecting therefrom without the use of tools, comprising:

(a) a generally vertically disposed elongate member having an inner and an outer disposed side, (b) a bail having a generally inverted U-shaped upper portion with dependent legs, (c) means for connecting the legs of the U-shaped portion to the upper portion of said elongate member, (d) a sheet of fibrous material connected to said outer side of the elongate member, (e) a helical spring which is affixed at one end to the inner side of said elongate member, (f) an L-shaped member having a first vertically disposed leg and a second horizontally disposed leg, with the first leg disposed adjacent the inwardly disposed side of said elongate member, with the upper end of said L-shaped member connected to the other end of said spring, (g) a guide on the inwardly disposed side of said elongate member in which said first leg is slidably movable, with said spring being at all times under tension when said bail engages said knob and said second leg engages the lower edge of said door, with said tensioned spring, bail, and L-shaped member cooperatively serving to removably hold said elongate member on said door.

References Cited in the file of this patent

UNITED STATES PATENTS 2,655,122 Adams _____ Oct. 13, 1953
2,894,487 Goldson _____ July 14, 1959